(12) United States Patent
Awdalla

(10) Patent No.: US 6,938,404 B2
(45) Date of Patent: Sep. 6, 2005

(54) SUPERCHARGED OPEN CYCLE GAS TURBINE ENGINE

(75) Inventor: Essam T. Awdalla, Raleigh, NC (US)

(73) Assignee: RRC-SGTE Technologies, LLC, Raleigh, NC (US)

( * ) Notice: Subject to any disclaimer, the term of this patent is extended or adjusted under 35 U.S.C. 154(b) by 59 days.

(21) Appl. No.: 10/669,279

(22) Filed: Sep. 23, 2003

(65) Prior Publication Data

US 2005/0061000 A1 Mar. 24, 2005

(51) Int. Cl.$^7$ .............................. F02C 9/00; F02C 6/00
(52) U.S. Cl. .................................. 60/39.27; 60/39.281
(58) Field of Search ........................... 60/39.27, 39.281, 60/39.25, 39.183, 795

(56) References Cited

U.S. PATENT DOCUMENTS

| | | | | | |
|---|---|---|---|---|---|
| 3,646,753 A | * | 3/1972 | Colman et al. | ............. | 60/39.27 |
| 3,659,417 A | * | 5/1972 | Grieb | ....................... | 60/39.183 |
| 3,727,400 A | * | 4/1973 | Harrison et al. | .............. | 60/795 |
| 3,777,479 A | * | 12/1973 | Hagen | ...................... | 60/39.281 |
| 4,087,961 A | * | 5/1978 | Avery | ...................... | 60/39.281 |
| 4,128,995 A | * | 12/1978 | Toot | ......................... | 60/39.281 |
| 4,435,958 A | * | 3/1984 | Klees | ......................... | 60/39.25 |
| 4,522,026 A | * | 6/1985 | Peterson et al. | .......... | 60/39.281 |
| 5,596,871 A | * | 1/1997 | Lenertz | .................... | 60/39.281 |
| 5,775,092 A | | 7/1998 | Hines | | |
| 6,050,082 A | * | 4/2000 | Leonard et al. | ........... | 60/39.183 |
| 2001/0045088 A1 | * | 11/2001 | Sugitani | .................. | 60/39.281 |

FOREIGN PATENT DOCUMENTS

| | | | | | |
|---|---|---|---|---|---|
| JP | | 63201328 A | * | 8/1988 | ............... 60/39.281 |
| WO | PCT/US00/17044 | | | 1/2001 | .............. F01D/1/06 |

* cited by examiner

Primary Examiner—Thai-Ba Trieu (57) ABSTRACT

The present invention provides a supercharged open cycle gas turbine engine comprising a core engine for generating shaft power output, a supercharger for increasing the pressure of intake air of the core engine, said supercharger includes a rotary ram-in compressor and a turbine driven by gases discharged from the core engine and having variable-area nozzle assembly; operator controlled means for elective bleeding of variable part of the exhaust gases discharged from the core engine and supplied to the supercharger turbine; at least one pressure sensor for detecting the degree of rise in the pressure of air supplied by the supercharger's compressor; and means for adjusting both the area of the nozzles of the supercharger's turbine and the rate of fuel supply to the core engine according to the detected degree of rise in the pressure of supplied air.

2 Claims, 7 Drawing Sheets

SUPERCHARGED OPEN CYCLE GAS TURBINE ENGINE

FIELD OF THE INVENTION

The present invention relates to a supercharged open cycle gas turbine engine and, more particularly, to a supercharged gas turbine engine with which appreciable degree of variability in the amount of developed shaft power output can be achieved.

DESCRIPTION OF PRIOR ART

The use of open-cycle gas turbine engines in the applications wherein flexible change in the amount of the developed shaft power output is needed during operation, e.g. Land vehicles, ships, and the like, is hindered by the inability to flexibly change the amount of shaft power output which a conventional open-cycle gas turbine engine can provide efficiently. As the shaft power output of a given gas turbine engine is proportional to the mass flow rate of the working gases within the engine, which depends on the dimensions of the inlet passage(s) of its compressor, the rotational speed of the compressor, and the density of the working gases, and as the efficiency of conventionally used types of Dynamic Compressors, i.e. Centrifugal and Axial flowing types, deteriorate sharply when operating at off-design rotational speeds, so, the shaft power output of a given open-cycle gas turbine engine can be practically changed only by either changing the density of its intake working gases, or changing the dimensions of the inlet(s) of its compressor.

Changing the dimensions of the inlet part(s) of the compressor of a gas turbine, as a mean for changing the shaft power output, is disclosed in U.S. Pat. No. 5,775,092 entitled "variable size gas turbine engine", wherein a variable flow booster, including a low pressure compressor is used to increase the mass flow rate of working gases within the engine. However, this design provides a gas turbine engine with two narrow ranges within which shaft power output can be changed during operation.

Changing the density of intake working gases within a gas turbine engine, as a mean for changing its shaft power output, is widely used in closed-cycle gas turbine engines, due to the closed nature of their operating cycle, with no prior art for its use in open-cycle gas turbine engines.

SUMMARY OF THE INVENTION

The present invention provides a supercharged open-cycle gas turbine engine, wherein the mass flow rate of working gases can be flexibly changed within a relatively wide range, and thus, appreciable degree of variability in the amount of its developed shaft power output can be achieved.

Accordingly, the supercharged gas turbine engine of the present invention comprises an open-cycle core gas turbine engine for generating shaft power output, said core engine includes a multi-stage compressor, the first stage of which being either a rotary ram compressor (disclosed in the inventor's earlier International Patent Application Number: PCT/US00/17044 entitled "Rotary ram fluid pressurizing machine") or a rotary ram-in compressor (disclosed in the inventor's earlier U.S. patent application Ser. No. 10/669,514 entitled "Rotary ram-in compressor"); a supercharger for supercharging intake air of the core engine, said supercharger includes a rotary ram-in compressor and a turbine driven by gases discharged from the core engine and having variable-area nozzle assembly; operator controlled means for elective bleeding of a variable part of the gases discharged from the core engine and supplied to the supercharger turbine, with the amount of the bled part of gases being adjustable by the operator according to the operating condition; at least one pressure sensor for detecting the degree of rise in the pressure of air supplied by the supercharger's compressor, either directly within the intake passage of the core engine's compressor, or indirectly at a selected point in-between the stages of the core engine's compressor; means for adjusting the area of the nozzles of the supercharger's turbine according to the detected degree of rise in the air pressure; and means for adjusting the rate of fuel supply to the core engine according to the pressure level of air supplied by the supercharger's compressor.

In operation, air is rammed through the feeding channels of the supercharger's rotary ram-in compressor, which displace it in a generally radial inward direction to the compressor's receiver. Then, the pressurized air is actively swept from the compressor's receiver by either a rotary ram compressor or a rotary ram-in compressor, which forms the first stage of the multi-stage compressor of the core engine.

In a preferred embodiment, a rotary ram compressor is used for active sweeping of air from the supercharger's compressor receiver, as the static pressure rise developed within its diverging channels prevents excess flow of air from the receiver through its channels, regardless of the pressure level developed within the receiver.

In another preferred embodiment, a rotary ram-in compressor is used for active sweeping of air from the supercharger's compressor receiver, as the static pressure rise developed within its receiver prevents excess flow of air from the receiver of the supercharger's compressor through its feeding channels, regardless of the pressure level developed within the receiver.

The density and the pressure level of the air within the receiver of the supercharger's compressor depends on the ratio between the volumetric rate with which air is fed to the receiver by the supercharger's compressor (which depends on the number of its feeding channels and their dimensions and velocity) and the volumetric rate with which air is swept from the receiver by either the rotary ram compressor (which depends on the number of its channels, the dimensions of its channels' inlets, and their velocity) or the rotary ram-in compressor. If the volumetric rate with which air is fed to the receiver equals the volumetric rate with which it is being swept, no pressure rise occurs within the receiver, with the pressure inside it being equivalent to that of the surrounding atmospheric air pressure. If the volumetric rate with which air is fed to the receiver is greater than its sweeping volumetric rate, the density of air within the receiver, and hence its pressure, will gradually increase till an equilibrium point is reached, at which the mass flow rates of air feeding and air sweeping from the receiver are equal to one another.

The maximum allowable pressure level within the receiver, at a given operating rotational speed, will depend on the velocity with which the feeding channels of the supercharger's rotary ram-in compressor moves, which should exceed the velocity of the back flow of the pressurized air from the receiver to the feeding channels, due to the pressure gradient between them.

As the velocity of the feeding channels of the supercharger's rotary ram-in compressor is kept below the speed of sound, to avoid the formation of shock waves, which if formed will interfere with the free ingestion of air by the feeding channels, so, the maximum allowable pressure level within the receiver will be around double that of the surrounding atmospheric pressure (at which the speed of back flow of the pressurized air from the receiver to the feeding channels will be almost equivalent to the speed of sound), with most of the provided pressure rise within the receiver being due to increased air density. In a preferred embodiment the receiver is provided with means for cooling the pressurized air within it, to improve the overall cycle efficiency of the supercharged engine.

As the rotary ram compressor (or the rotary ram-in compressor), through the channels of which air is being actively swept from the receiver, forms the first stage of the multi-stage compressor of the core turbine engine, with its operating rotational speed being maintained around an optimum design value to avoid degradation of the overall pressure ratio level provided by the core engine's compressor, so, the volumetric rate with which air is actively swept from the receiver of the supercharger's compressor will be constant during operation, with the density and pressure level of air within the receiver being dependent on and proportional to the volumetric rate with which air is fed to the receiver through the supercharger's compressor, which depends on the operating rotational speed of the supercharger's compressor, as described herein before.

As the operating rotational speed of the supercharger's compressor depends on the amount of driving shaft power supplied to it from the supercharger's turbine, which depends on the mass flow rate of working gases within the supercharger's turbine, so, it can be controlled by changing the mass flow rate of working gases within the supercharger's turbine. This is achieved by designing the passage through which the discharged gases from the core engine's turbine are directed to the supercharger's turbine with a suitable side passage, having valve means within, for elective partial bleeding of the discharged gases. The amount of bled gases through the side passage is controlled by the operator as needed, through the valve means, with the amount of shaft power extracted from the residual (non bled) part of the gases, by the supercharger's turbine, being utilized in driving the supercharger's compressor, which will self adjust its rotational speed accordingly.

So, in operation, the density of air at the inlet passage(s) of the core engine's compressor, and hence, the mass flow rate of working gases within the core engine, are controlled by adjusting the position of the valve means within the said side passage, as described herein before, and thus, the amount of the provided shaft power output from the core engine can be flexibly changed.

To maintain the temperature of the working gases at the inlet of the core engine's turbine around optimum design level, the rate of fuel supply to the combustion chamber of the core engine is adjusted according to the mass flow rate of working gases within the core engine, which is proportional to the pressure level (and density) of air provided by the supercharger's compressor. In a preferred embodiment, the rate of fuel supply is adjusted by spring loaded plunger means actuated by the pressure level of air in the supercharger's compressor receiver. In another preferred embodiment, the degree of rise in the pressure of air provided by the supercharger's compressor is monitored by a pressure sensor, either directly within the receiver, or indirectly at a selected point in-between the stages of the core engine's compressor, which delivers a correlative signal to a linear step motor controlling the position of plunger means, which adjusts the rate of fuel supply to the core engine accordingly.

For optimum extraction of energy from the discharged gases by the supercharger's turbine at different static pressure levels provided by the supercharger's compressor, the angles of inclination of the supercharger's turbine nozzles are adjusted to provide optimum degrees of static pressure drop within accordingly. In a preferred embodiment, the degree of rise in the pressure of air provided by the supercharger's compressor is monitored by a pressure sensor, either directly within the receiver, or indirectly at a selected point in-between the stages of the core engine's compressor, which delivers a correlative signal to a stepping motor controlling the angle of inclination of the vanes, and thus adjusting their area accordingly.

BRIEF DESCRIPTION OF THE DRAWINGS

The description of the objects, features and advantages of the present invention, will be more fully appreciated by reference to the following detailed description of the exemplary embodiments in accordance with the accompanying drawings, wherein.

DETAILED DESCRIPTION

Figure 1:
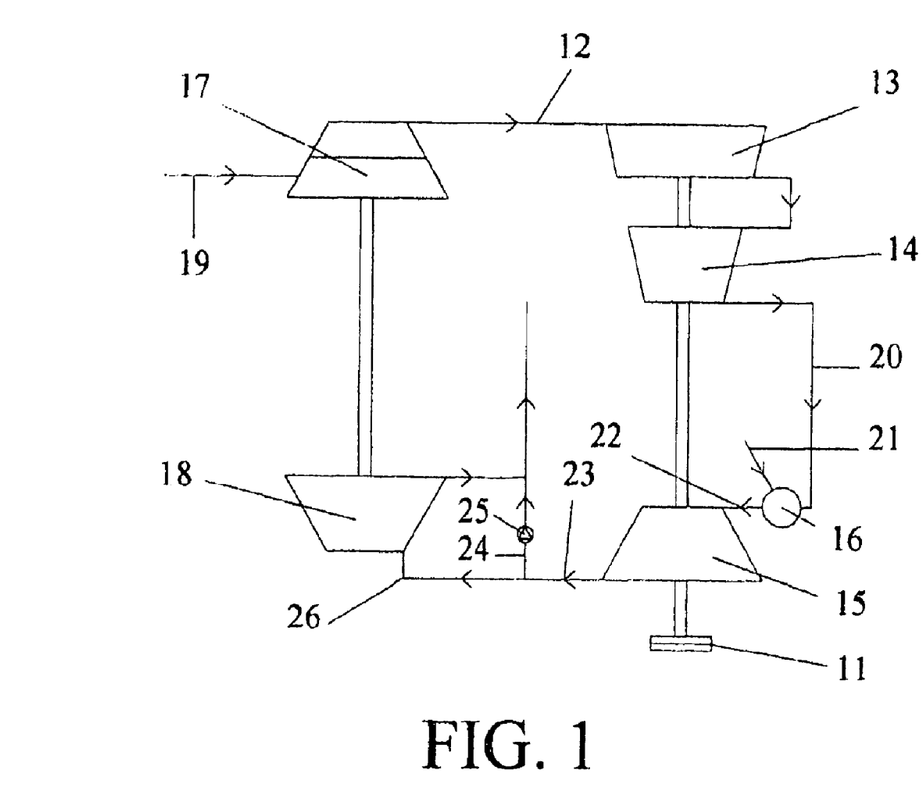
FIG. 1 is a diagrammatic representation of the operating cycle of an open cycle supercharged gas turbine engine in accordance with the present invention.

FIG. 1 is a diagrammatic representation of the operating cycle of the supercharged gas turbine engine in accordance with the present invention. Functionally, the supercharged gas turbine engine is divided into two main components: a core gas turbine engine for generating shaft power output (11), and a supercharger for supercharging intake air (12) of the core engine. The core engine includes a multi-stage compressor (13,14), the first stage of which (13) being a rotary ram compressor or a rotary ram-in compressor; a turbine (15), which may have a free power turbine stage (not shown in the drawing for simplicity); and a combustion chamber (16). The supercharger includes a rotary positive displacement compressor (17); and a turbine (18) having variable area nozzle assembly.

In operation, air (19) is rammed into the supercharger's compressor (17) wherein its density and pressure are increased. The pressurized air (12) is fed to the core engine's compressor (13,14) for further increasing its static pressure. The fully pressurized air (20) is introduced to the combustion chamber (16) wherein fuel (21) is burned. The combustion products (22) are introduced to the core engine's turbine (15) wherein part of its energy is extracted and converted into shaft power supplied to both the core engine's compressor (13,14) and to the driven mechanism (11). Gases (23) discharged from the core engine's turbine (15) are directed to the supercharger's turbine (18) wherein another part of its energy is extracted and converted into shaft power used in driving the supercharger's compressor (17).

The volumetric rate with which working air (19) is ingested by the supercharger's compressor (17) is adjusted by changing the operating rotational speed of supercharger's compressor in response to the amount of shaft power provided to it by the supercharger's turbine (18), which is adjusted by changing the mass flow rate of working gases within the supercharger's turbine (18). This is achieved by elective partial bleeding of the gases (23) discharged from the core engine's turbine (15) through a side passage (24) provided with valve means (25), with the residual (non bled) part of the discharged gases (26) being directed to the supercharger's turbine (18) wherein part of its energy is extracted and converted into driving shaft power supplied to the supercharger's compressor (17).

The working air (12) provided by the supercharger's compressor is actively swept by the rotary ram compressor or the rotary ram-in compressor stage (13) of the core engine, with the density and pressure of working air (12) supplied to the core engine's compressor being self adjusted according to the ratio between the feeding and sweeping volumetric rates, and with the mass flow rate of working gases within the core engine and the amount of its developed shaft power output being adjusted accordingly.

Figure 2:
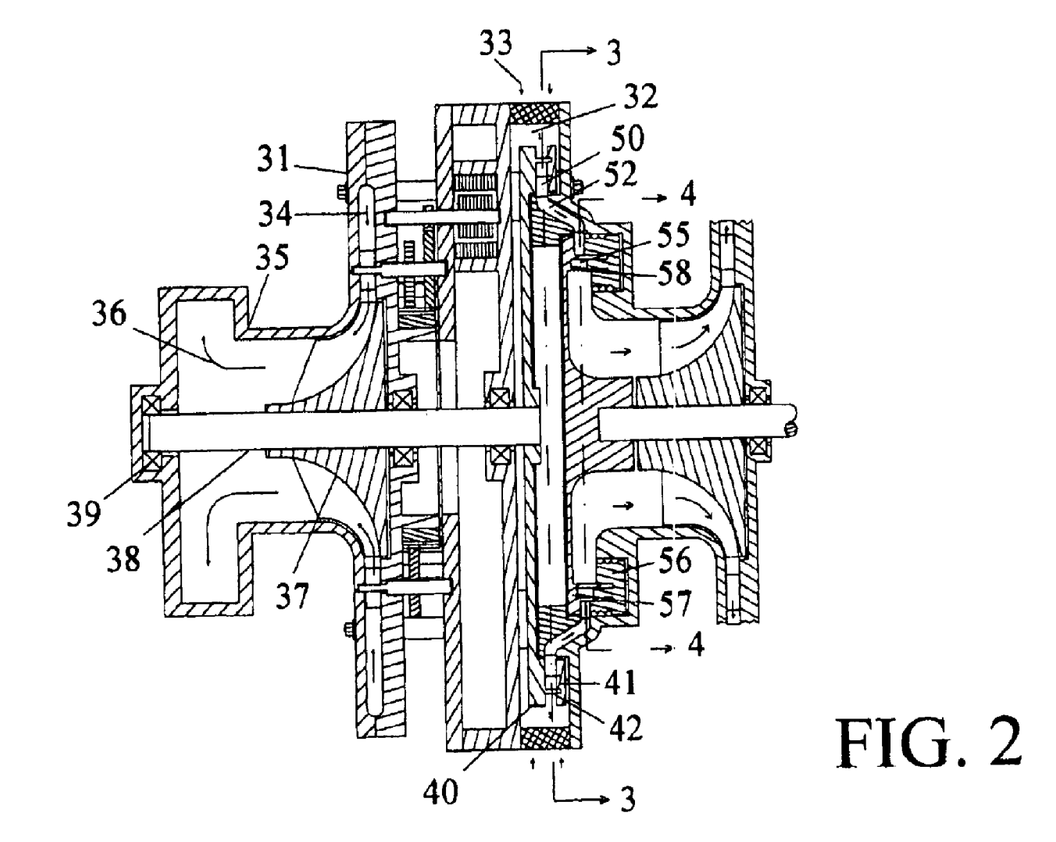
FIG. 2 is a sectional view in a schematic representation of an exemplary embodiment of a supercharger used for supercharging intake air of a core gas turbine engine, in accordance with the present invention.

FIG. 2 is a sectional view in a schematic representation of an exemplary embodiment of a supercharger used for supercharging intake air of a core gas turbine engine, in accordance with the present invention.

Figure 3:
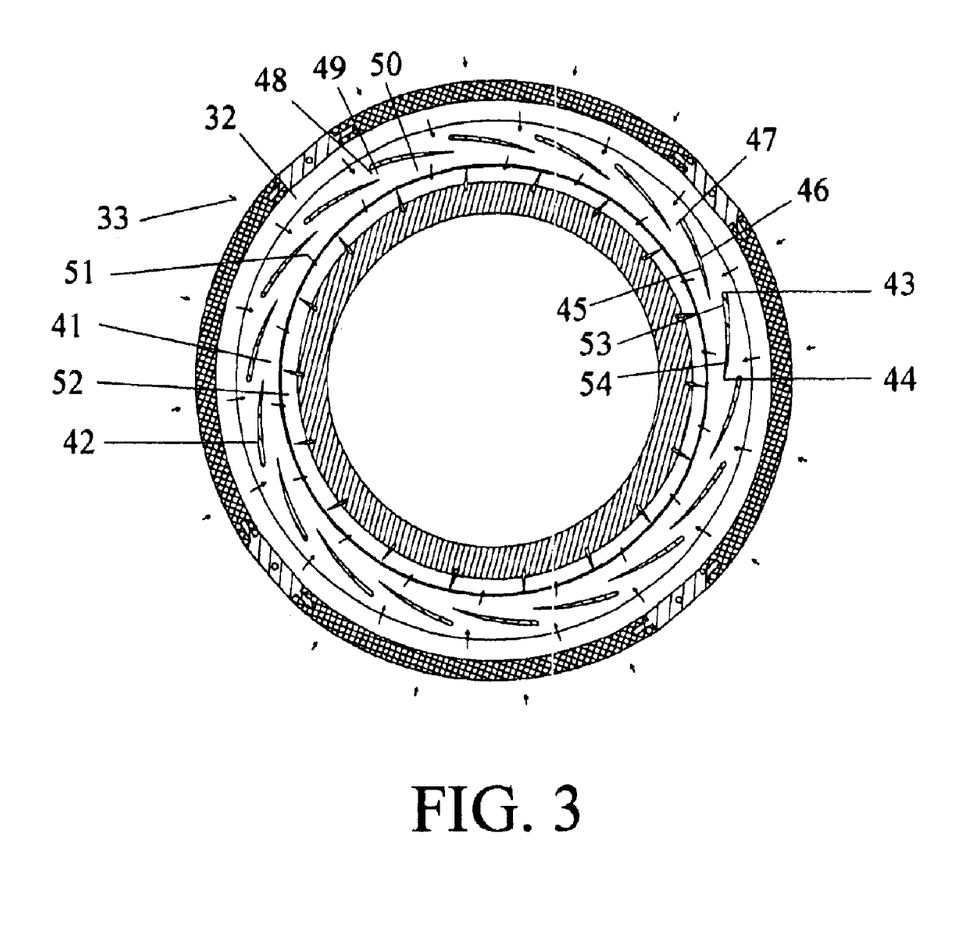
FIG. 3 is a cross sectional view, taken at the plane of line 3—3 in FIG. 2.

The main components of the supercharger in this embodiment are a stationary casing (31) having a first inlet passage (32) for admission of air (33), a second inlet passage for admission of the gases (34) discharged from the turbine of the core engine (not shown in the drawing for simplicity), an exit passage (35) for discharge of exhaust gases (36) discharged from the supercharger's turbine (37), and a receiver (52); a drive shaft (38) supported for rotation in a given direction inside the casing by an arrangement of bearings (39); a supercharger's turbine (37) housed inside the casing and secured for rotation with the drive shaft (38); and a supercharger's compressor rotor assembly housed inside the casing and secured for rotation with the drive shaft (38). The supercharger's compressor rotor assembly comprises a first disk (40) secured for rotation with the drive shaft (38) and lying in a first plane transverse to the rotational axis of the drive shaft; a second disk (41) having a large open center and a widened rim, and lying in a second plane transverse to the rotational axis of the drive shaft, with the inner surfaces of the two disks defining an annular space in-between; and a plurality of vanes (42) arranged circumferentially within said annular space, each vane attached to both disks defining the annular space. As shown in FIG. 3 which is a cross sectional view, taken at the plane of line 3—3 in FIG. 2, each vane has a leading edge (43), a trailing edge (44), a concave surface (45) and a convex surface (46), with the average angles of inclination of the successive portions of the vane with respect to a plane comprising the midpoint of the vane and perpendicular to a radial plane including the rotational axis of the rotor and the midpoint of the vane decreases preferably gradually from its leading edge towards its trailing edge, within a range from about +2 to about −18 degrees, the opposing parts of the surfaces of each two adjacent vanes along with the opposing parts of the two disks' surfaces confined between the opposing parts of the surfaces of each two adjacent vanes defining a feeding channel (47) between them, each feeding channel (47) having an inlet (48) communicating with the inlet passage of the compressor (32), and an outlet (49) communicating with the relatively inner part of the annular space confined by the vanes (50).

In operation, air (33) is rammed through the feeding channels (47) of the supercharger's compressor, which direct it to the relatively inner part of the annular space confined by the vanes (50), wherein the rammed in air is first compressed by both the pressurized air (51) collecting within the compressor's receiver (52) and by the reaction force developed on the free parts of the concave surfaces of the vanes next to the outlets 30 of the feeding channels (53), then, the pressurized freshly introduced air is displaced in a generally radial inward direction to the receiver (52) by the relatively inner free parts of the concave surfaces of the vanes (54). The pressurized air (51) is actively swept from the receiver (52) by a rotary ram compressor (55), which forms the first stage of the multi-stage compressor of the core engine.

Figure 4:
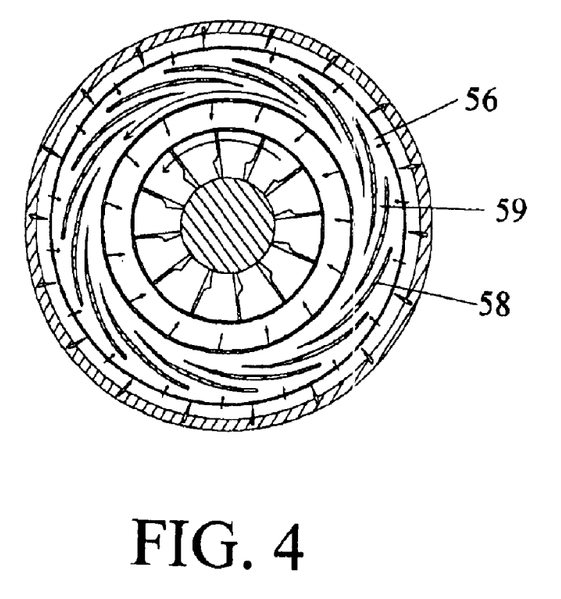
FIG. 4 is a cross sectional view, taken at the plane of line 4—4 in FIG. 2.

The rotary ram compressor (55) includes two disks (56, 57), defining an annular space in-between, and a plurality of vanes (58) arranged circumferentially within said annular space. And as shown in FIG. 4, which is a cross sectional view, taken at the plane of line 4—4 in FIG. 2, the opposing parts of each two adjacent vanes define a diverging channel (59) in-between, through which air is actively swept from the receiver (52).

A rotary ram compressor (55) is used for active sweeping of air from the supercharger's compressor receiver, as the static pressure rise developed within its diverging channels (59) prevents excess flow of air from the receiver through its channels (59), regardless of the pressure level developed within the receiver (52), with the density and the pressure level of the air within the receiver (52) being dependant on the ratio between the volumetric rate with which air is fed to it by the supercharger's compressor and the volumetric rate with which air is swept from it by the rotary ram compressor (55). The maximum allowable pressure level within the receiver (52), at a given operating rotational speed, will depend on the velocity with which the feeding channels (47) of the positive displacement compressor moves, which should exceed the velocity of the back flow of the pressurized air (51) from the receiver (52) to the feeding channels (47), due to the pressure gradient between them.

Figure 5:
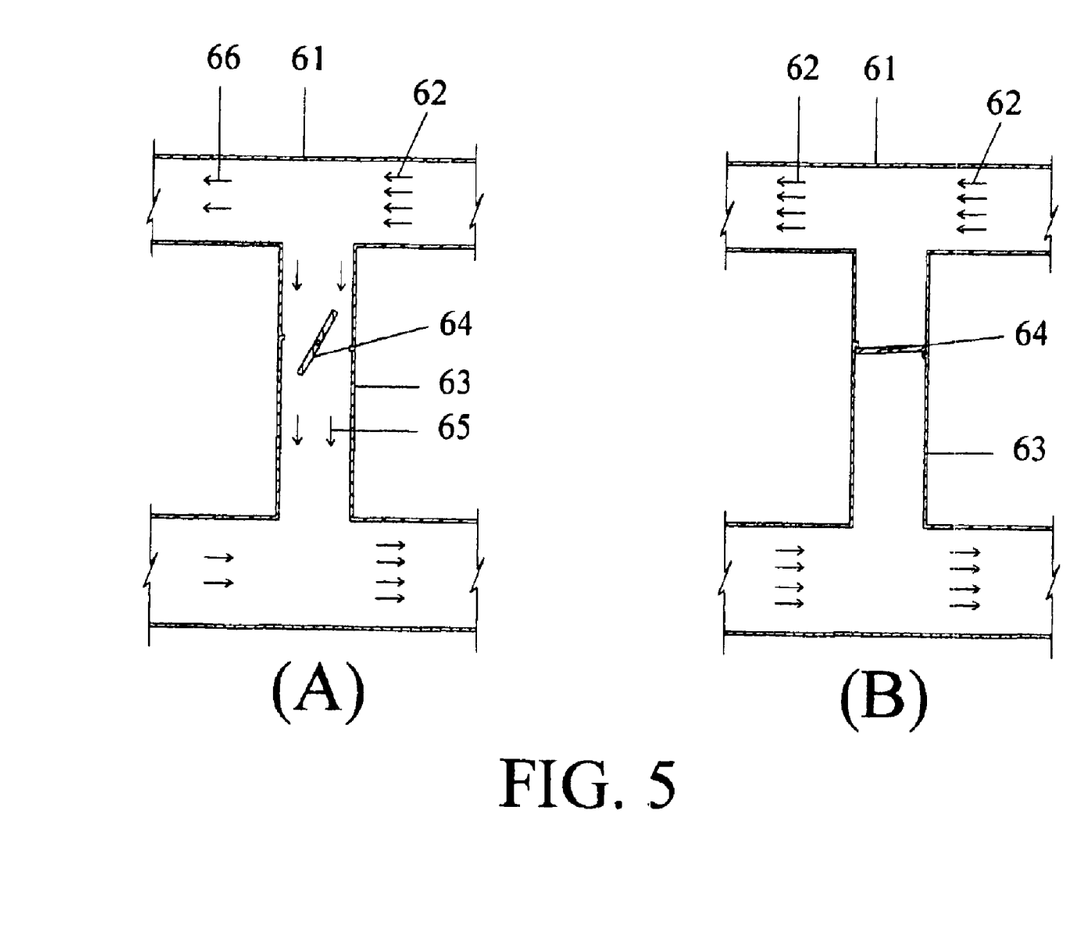
FIGS. 5A and 5B are sectional views in a schematic representation of a side passage used for elective partial bleeding of the exhaust gases, in accordance with the present invention, with its valve means in partially opened and fully closed positions.

To enable changing the amount of shaft power output provided by the core engine, and as shown in FIGS. 5A and 5B, the passage (61) through which the discharged gases (62) from the core engine's turbine are directed to the supercharger's turbine is provided with a side passage (63), having operator controlled valve (64) within, for elective partial bleeding of the discharged gases (62)

In FIG. 5A the valve (64) is partially opened, with part (65) of the discharged gases (62) being bled through the side passage (63). The residual (non bled) gases (66) are supplied to the supercharger's turbine, wherein part of its energy is extracted and converted into shaft power supplied to the supercharger's compressor which will self adjust its rotational speed accordingly, with the density of air within the supercharger's compressor receiver, the mass flow rate of gases within the core turbine, and the amount of provided shaft power output by the core engine being adjusted accordingly, as described herein before.

In FIG. 5B the valve (64) is closed, with all the discharged gases (62) being supplied to the supercharger's turbine, wherein part of its energy is extracted and converted into shaft power supplied to the supercharger's compressor which will self adjust its rotational speed accordingly, with the density of air within the supercharger's compressor receiver, the mass flow rate of gases within the core turbine, and the amount of provided shaft power output by the core engine being adjusted accordingly.

Control means are provided in the supercharged open cycle gas turbine engine of the present invention to enable adjusting the rate with which fuel is supplied to the combustion chamber of the core engine (to maintain the temperature of the working gases at the inlet of the core engine's turbine around optimum design level) and the angle of inclination of the nozzles of the supercharger's turbine (for optimum extraction of energy from the exhaust gases by the supercharger's turbine) according to the pressure level of air provided by the supercharger's compressor.

Figure 6:
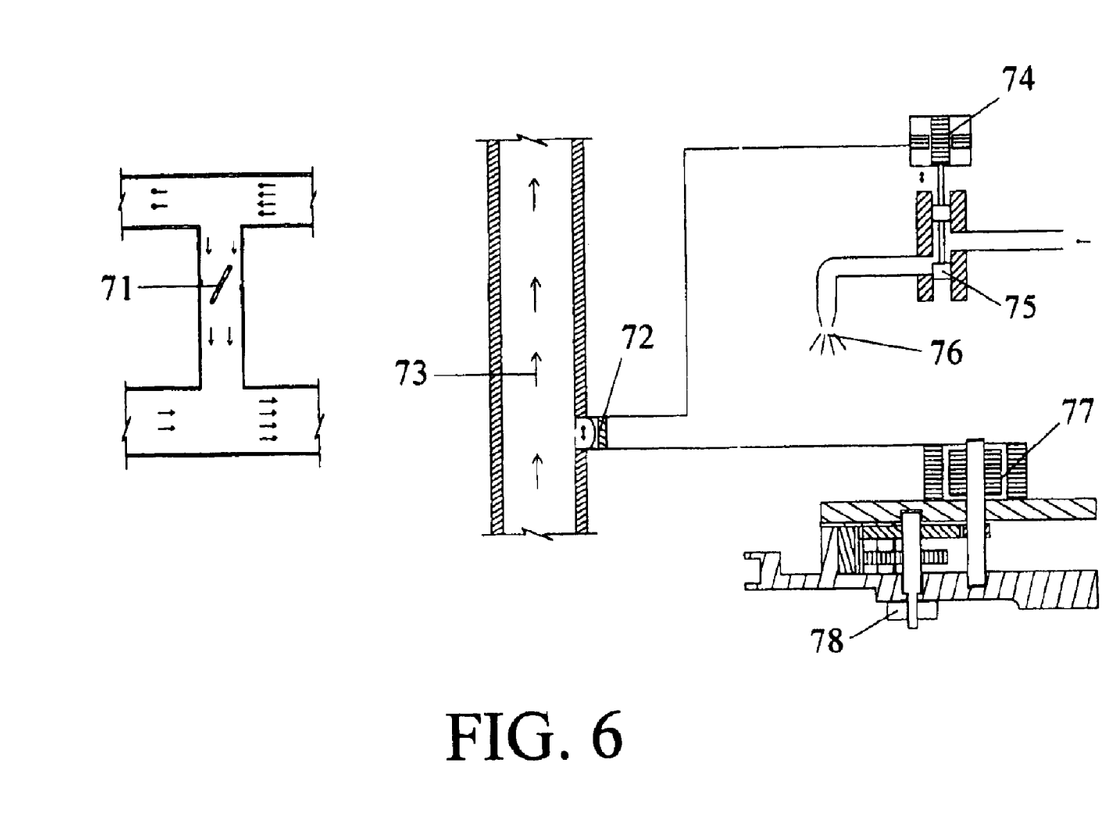
FIG. 6 is a schematic representation of an arrangement of control means used in a supercharged gas turbine engine in accordance with the present invention.

In a preferred embodiment, as shown in FIG. 6, the arrangement of control means comprises operator controlled valve (71) for elective bleeding of a variable part of the gases discharged from the core engine and supplied to the supercharger's turbine; a pressure sensor (72) for monitoring the pressure of air (73) provided by the supercharger's compressor; a linear step motor (74) controlling the position of a plunger (75) which adjusts the rate of fuel supply (76) to the core engine; and a stepping motor (77) controlling the angle of inclination of the vanes (78) of the supercharger's turbine.

In operation, the pressure sensor (72) monitors the pressure of air (73) provided by the supercharger's compressor (which is indirectly controlled by the position of the valve (71), as described herein before) and sends correlative signals to both the linear step motor (74) and the stepping motor (77) controlling the rate of fuel supply (76) to the core engine and the angle of inclination of the vanes (78) of the supercharger's turbine respectively.

Figure 7:
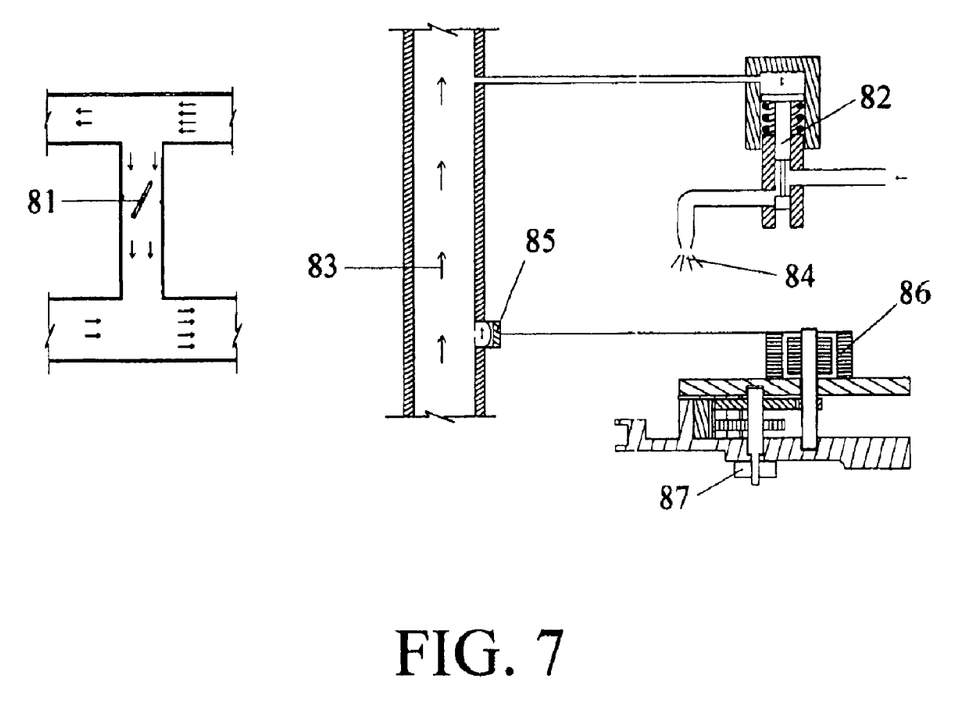
FIG. 7 is a schematic representation of another arrangement of control means used in a supercharged gas turbine engine in accordance with the present invention.

In another preferred embodiment, as shown in FIG. 7, the arrangement of control means comprises operator controlled valve (81) for elective bleeding of a variable part of the gases discharged from the core engine and supplied to the supercharger's turbine; a spring loaded plunger (82) actuated by the pressure level of air (83) in the receiver to adjust the rate of fuel supply (84) to the core engine; a pressure sensor (85) for monitoring the pressure of air (83) provided by the supercharger's compressor; and a stepping motor (86) controlling the angle of inclination of the vanes (87) of the supercharger's turbine.

In operation, the pressure sensor (85) monitors the pressure of air (83) provided by the supercharger's compressor (which is indirectly controlled by the position of the valve (81), as described herein before) and sends a correlative signal to the stepping motor (86) controlling the angle of inclination of the vanes (87) of the supercharger's turbine accordingly. The rate of fuel supply (84) to the core engine is adjusted according to the position of the spring loaded plunger (82) actuated by the pressure level of air (83) in the receiver as described herein before.

That which is claimed:

1. A supercharged gas turbine engine comprising:

an open-cycle core gas turbine engine for generating shaft power output, said core gas turbine engine includes a multi-stage compressor, a first stage of the multi-stage compressor being a rotary ram compressor;

a supercharger for supercharging intake air of the core engine, wherein said supercharger includes a rotary ram-in compressor and a turbine, and wherein said turbine has variable-area nozzle assembly and is driven by gases discharged from the core engine;

operator controlled means for elective partial bleeding of the gases discharged from the core engine and supplied to the supercharger's turbine;

at least one pressure sensor for detecting the degree of rise in the pressure of air supplied by the supercharger's compressor;

means for adjusting the area of the nozzles of the supercharger's turbine according to the detected degree of rise in the air pressure; and means for adjusting the rate of fuel supply to the core engine according to the pressure level of air supplied by the supercharger's compressor.

2. A supercharged gas turbine engine comprising:

an open-cycle core gas turbine engine for generating shaft power output, said core gas turbine engine includes a multi-stage compressor, a first stage of the multi-stage compressor being a rotary ram-in compressor;

a supercharger for supercharging intake air of the core engine, wherein said supercharger includes a rotary ram-in compressor and a turbine, and wherein said turbine has variable-area nozzle assembly and is driven by gases discharged from the core engine;

operator controlled means for elective partial bleeding of the gases discharged from the core engine and supplied to the supercharger's turbine;

at least one pressure sensor for detecting the degree of rise in the pressure of air supplied by the supercharger's compressor;

means for adjusting the area of the nozzles of the supercharger's turbine according to the detected degree of rise in the air pressure; and means for adjusting the rate of fuel supply to the core engine according to the pressure level of air supplied by the supercharger's compressor.

* * * * *